May 17, 1949. H. W. LEVERENZ 2,470,173
PHOSPHOR MATERIALS
Filed Oct. 17, 1945

INVENTOR.
Humboldt W. Leverenz
BY
Charles McClain
ATTORNEY

Patented May 17, 1949

2,470,173

UNITED STATES PATENT OFFICE 2,470,173

PHOSPHOR MATERIALS

Humboldt W. Leverenz, Princeton, N. J., assignor to Radio Corporation of America, a corporation of Delaware Application October 17, 1945, Serial No. 622,800

2 Claims. (Cl. 250—80)

This invention relates to phosphor materials in composite structures capable of efficient excitation by energies of different character.

In certain uses it is desirable to excite luminescent screens both by corpuscular energy (alpha particles, cathode rays and other charged and uncharged particles) and undulatory energy (gamma rays, X-rays, ultra-violet, light, infra-red, etc.). As one example, instrument lighting may be cited where excitation of the phosphor in the instrument dials is primarily obtained by ultra-violet light from a lamp, such as the RP12, with radium excitation as a stand-by source of excitation in case of failure of the lamp.

The efficiency of luminescent materials is often quite different under action of the two kinds of radiant energy. Some phosphors efficiently excited by ultra-violet are only feebly excited by cathode rays, for example. On the other hand, some phosphors efficiently luminesce under corpuscular excitation and inefficiently luminesce under excitation by undulatory energy. There are likewise differences in efficiency in luminescence of phosphors excited by different forms of the energies in each of the two kinds.

Undulatory energy and corpuscular energy are translated in the phosphor materials in different ways. Undulatory energy, such as ultra-violet, in passing into a phosphor material, gives up its energy only to atoms or other physical parts which have allowed electronic transitions of the same magnitude as the exciting quanta.

A quantum of ultra-violet passes through a luminescent material with substantially undiminished energy until it reaches an atomic or molecular spot capable of taking up that entire quantum. Corpuscular radiations, however, exhibit much less discrimination, giving up their energies a fraction at a time to various atoms, ions and other parts of the material passed through. A fast-moving alpha particle passes into a material and successively loses fractions of its energy of the order of 30 electron volts indiscriminately to almost any spots in its path capable of absorbing any part of its energy total.

There are many materials, therefore, that efficiently fluoresce under ultra-violet or undulatory excitations in general, because the exciting energy is imparted only where it is most effective, that is, in the active centers of luminescence. On the other hand, fewer materials are efficient under corpuscular excitations because the indiscriminately translated energy must be transferred to the luminescent centers. Only crystalline materials are efficient in thus transferring the energy from one part of the material to another, since crystals minimize the attenuations and heat losses such as occur during energy transfer in amorphous or glassy structures.

Wherever it is desired to use both undulatory energy and corpuscular energy, such as both ultra-violet and alpha particles, for example, as in aircraft instrument lighting, two different phosphor materials are often required for most efficient results, one for the former and another for the latter type of excitation.

It is therefore an object of the invention to provide a luminescent screen for dual excitation having one phosphor material for efficient excitation by corpuscular energy and another material for efficient excitation by undulatory energy.

Another object is to provide a stratified luminescent screen for dual excitation having one phosphor material for efficient excitation by corpuscular energy and another material for efficient excitation by undulatory energy.

Another object is to provide a luminescent screen for dual excitation having a layer of manganese-activated magnesium orthogermanate for excitation by alpha particles and another layer of manganese-activated germanate of greater magnesium oxide content than ortho proportions for excitation by ultra-violet.

Other objects will appear in the following description, reference being had to the drawings, in which.

I have found that substantially ortho magnesium germanate $Mg_2GeO_4$:Mn is very efficient for corpuscular energy, especially alpha particles, while a magnesium germanate of greater magnesium-oxide content than ortho proportions, e. g., $Mg_4GeO_6$:Mn, is most efficient for undulatory energy, such as ultra-violet. In both germanates, red light is emitted, which is most suitable for night uses, as red does not reduce the efficiency of the dark-adapted eye to discern dim objects. Both germanates give white light reflection in white light of daytime. In both germanate phosphors an efficient activator is manganese of known molar proportions, such as 0.001 to 0.2 mole of manganese per mole of magnesium germanate. In such case, the underlying bulk 1 in Fig. 1 of the luminescent screen comprises magnesium ortho germanate phosphor $Mg_2GeO_4$:Mn and the thin surface layer 2 comprises a germanate phosphor of greater magnesium content, e. g. $Mg_4GeO_6$:Mn.

The term "ortho proportion" is used in a practical sense, since exact stoichiometric equality is impossible to obtain with the usual means for volumetric and gravimetric proportioning of the ingredients MgO and $GeO_2$, and since the degree of reaction during crystallization of the phosphor is an added variable. By ortho proportion is meant a material wherein the mole ratio of MgO to $GeO_2$ is substantially two to one.

Figure 1:
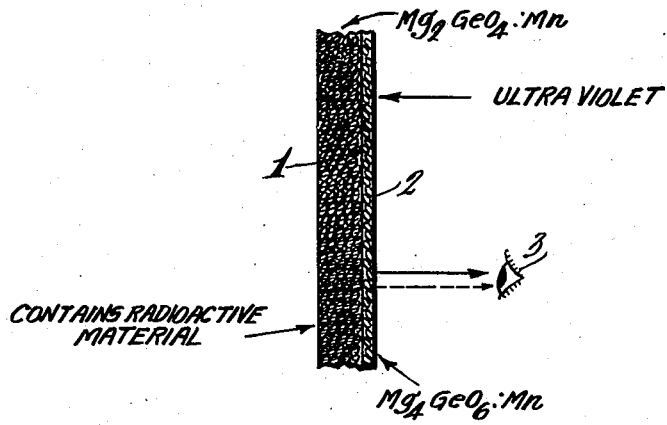
Fig. 1 is a fragmentary view of a composite luminescent screen of my invention.
Figure 2:
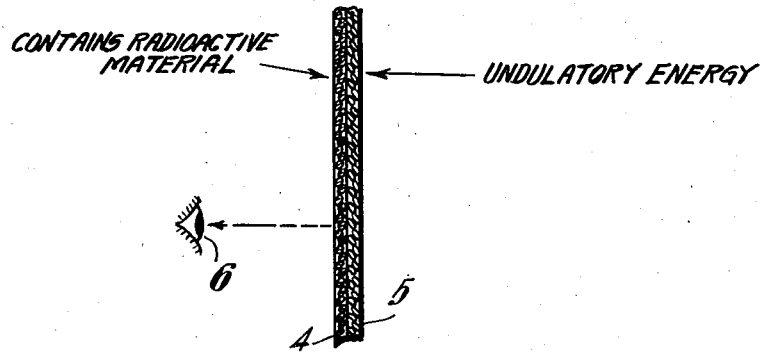
Fig. 2 is a similar view of another form of composite luminescent screen.

The thicknesses of the layers are somewhat complex functions of particle size of the phosphor constituents, the penetrating power of the exciting radiations, the relative scattering and absorbing characteristics of the different phosphor materials and the practical considerations requiring enhancement of the luminescence from one type of radiation as compared with that from another type of radiation. In general, the thickness of the luminescent layer exposed to excitation of undulatory nature should be of the order of one to ten particles thick. The thickness of the other luminescent layer or layers may be adjusted to the type and quality of corpuscular radiation in manners well known in the art. For example, the thickness of a corpuscular-excited layer should not greatly exceed the penetrating power of the corpuscular radiator, except where large crystals are used, in which case approximately a single layer of crystals is optimum for excitation by corpuscular rays extraneous to the screen, while for layers excited by corpuscular excitations emanating from within the screen (such as radium-salt excitation), the thickness is usually from .01 mm. to 1 mm. The thickness of the layers must be chosen to allow the observer to see the luminescence not only of the layer nearest the eye 3, but also the luminescence of the underlying layer or layers, one form of which is shown in Fig. 1 and another in Fig. 2. In Fig. 1 the layer or layers 2 should be thin enough to allow a major part of the luminescence from layer or layers 1 to reach the eye at 3. In Fig. 2 the layer 4 should be thin enough to allow a major part of the luminescence from layer or layers 5 to reach the eye at 6.

Various modifications of the improvement may be made without departing from the spirit of the invention.

Having described my invention, what I claim is:

1. A composite phosphor screen comprising a layer of magnesium orthogermanate and manganese activator for excitation by corpuscular energy and a second layer of magnesium germanate of greater magnesium oxide content than that contained in said orthogermanate and manganese activator, said last-mentioned germanate containing a ratio active material.

2. A composite phosphor screen comprising a layer of magnesium orthogermanate, a manganese activator therefor for excitation by corpuscular energy, a layer of activated magnesium germanate having the formula $Mg_4GeO_6$:Mn, said first-mentioned layer containing radium salts for its activation, and one of said layers being transparent to the light emitted by the other layer.

HUMBOLDT W. LEVERENZ.

REFERENCES CITED

The following references are of record in the file of this patent:

UNITED STATES PATENTS

| Number | Name | Date |
| --- | --- | --- |
| 2,066,044 | Leverenz | Dec. 29, 1936 |